(12) United States Patent
Kutsuna (10) Patent No.: US 8,262,184 B2
(45) Date of Patent: Sep. 11, 2012

(54) INKJET PRINTING APPARATUS AND INKJET PRINTING METHOD

(75) Inventor: Hideaki Kutsuna, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 12/850,819

(22) Filed: Aug. 5, 2010

(65) Prior Publication Data

US 2011/0037794 A1 Feb. 17, 2011

(30) Foreign Application Priority Data

Aug. 11, 2009 (JP) .................................. 2009-186577

(51) Int. Cl.
*B41J 29/38* (2006.01)
(52) U.S. Cl. ......................................................... 347/14
(58) Field of Classification Search ................. 347/9, 12, 347/14, 15
See application file for complete search history.

(56) References Cited

U.S. PATENT DOCUMENTS

| 6,779,873 | B2 * | 8/2004 | Maeda et al. ................... 347/43 |
| 2007/0236714 | A1 | 10/2007 | Uji et al. |
| 2009/0015612 | A1 | 1/2009 | Teshigawara et al. |

FOREIGN PATENT DOCUMENTS

| JP | 2007-306549 A | 11/2007 |
| JP | 2008-207385 A | 9/2008 |
| JP | 2009-034996 A | 2/2009 |

* cited by examiner

*Primary Examiner* — An Do
(74) *Attorney, Agent, or Firm* — Fitzpatrick, Cella, Harper & Scinto (57) ABSTRACT

A mask of Y for a first pass is a mask in which a checker pattern having a high frequency characteristic is made to be the arrangement of the print permitting pixels, and a mask of C for the first pass is a mask in which a random image having a lower frequency characteristic is made to be the arrangement of the print permitting pixels. Further, each of the masks of Y and C for a second pass has an arrangement that mutually complements the arrangement of the print permitting pixels of the mask for the first pass. By using such masks, unevenness of the permeation speed caused by beading on a printing medium can be reduced. Further, high tolerance for interference to the mask of the prior pass and for influence of external disturbances can be achieved.

7 Claims, 10 Drawing Sheets

INKJET PRINTING APPARATUS AND INKJET PRINTING METHOD

BACKGROUND OF THE INVENTION

1. Field of the Invention

The present invention relates to an inkjet printing apparatus and an inkjet printing method, and more particularly, to a configuration to reduce density unevenness caused by beading by way of arranging ink dots that constitute an image.

2. Description of the Related Art

In the field of inkjet printing, a so-called multi-pass printing method has been broadly known in which printing of an area is completed by scanning the same area with a printing head a plurality of times between which conveyance of a predetermined amount of a printing medium is performed. According to this printing method, a high quality image can be printed by reducing density unevenness caused by variation in the ink ejection characteristics among a plurality of nozzles that are provided on the printing head. In the multi-pass printing method, generally, the greater the number of scans (the number of passes) there are to complete the printing, the greater the variation in the ink ejection characteristics among the nozzles, as described above, is dispersed and therefore the higher the image of quality is printed. However, the greater the number of the passes is, the more time is needed to complete the printing of an area.

On the other hand, a problem of density unevenness or color unevenness has been known in an ink jet printing as caused by beading such that ink droplets are united on a printing medium such as printing paper before permeating thereinto. Various measures have been proposed toward this problem. In Japanese Patent Laid-Open No. 2007-306549 and Japanese Patent Laid-Open No. 2008-207385, a method of reducing density unevenness or color unevenness caused by the beading is described in which ink dots are arranged to be avoided uniting to each other on the printing medium.

However, the effect of reducing unevenness may not be exhibited sufficiently in the multi-pass printing even when the method of reducing density unevenness that is described in Japanese Patent Laid-Open No. 2007-306549 and Japanese Patent Laid-Open No. 2008-207385 is employed.

More specifically, a higher speed has been desired in an inkjet printing apparatus in recent years, and because of this, one of the measures considered has been to decrease the number of passes in the multi-pass printing. In this case, when the multi-pass printing is performed with a small number of passes such as two passes, the arrangement of the dots that are formed by the ejection of the ink for expressing a high density portion where an image density is relatively high comes to have a high density. Specifically, the ink droplets are ejected on each of pixels that are adjacent to each other in almost all of the pixels on which the dot is to be formed by the ejection of the ink. As a result, beading such that ink droplets are united may occur on almost the entire area of the printing medium. In such condition of which the ink droplets are applied with high density, beading may not be suppressed or reduced sufficiently even when the technique disclosed in Japanese Patent Laid-Open No. 2007-306549 and Japanese Patent Laid-Open No. 2008-207385 is employed.

On the other hand, when the ink is applied onto the printing medium, the ink permeation speed on the portion where the ink is applied decreases in general. Therefore, when the multi-pass printing with a small number of passes is performed, a distribution of a permeation speed may occur in which the permeation speed becomes low in the portion where the beading occurred in the prior pass and the permeation speed remains higher in the other portion. Then, in the posterior pass, beading occurs on almost the entire surface of the printing medium and the united ink droplets of the beading easily move according to the distribution of the permeation speed that occurred in the prior pass. As a result, the ink droplets that are united in the posterior pass may move a relatively large distance and may be fixed in a position that is different from the original position (pixel). That is, image unevenness generated in the prior pass causes the image unevenness of the posterior pass due to the distribution of the permeation speed. With such mechanism, a decrease of the number of passes to make printing speed higher includes a problem that density unevenness or color unevenness due to the beading becomes remarkable.

A method of adopting a dot arrangement having a high frequency characteristic can be considered as one of the methods of reducing the unevenness due to beading. This dot arrangement having the high frequency characteristic has little low-frequency components, and the distribution of beading that can be generated in an image printed in the prior pass has a short period (high frequency). As a result, the distance that the united ink moves in the posterior pass can be small, and the ink can be restrained from being fixed in a position that is different from the original position. However, because the dot arrangement having a high frequency characteristic has high periodicity, it can be easily influenced by the dot arrangement of other ink or external disturbances such as air currents and mechanical vibration, and other problem such as moiré patterns and stripes on an image may be remarkably brought about. In other words, an image of the dot arrangement having the high frequency characteristic is an image having low robustness.

SUMMARY OF THE INVENTION

The objective of the present invention is to provide an inkjet printing apparatus and an inkjet printing method in which density unevenness caused by beading generated in multi-pass printing having a small number of passes is reduced and an image having high robustness can be printed.

In a first aspect of the present invention, there is provided an ink jet printing apparatus that performs relative scanning to a printing medium with a printing head that arranges a plurality of nozzle arrays each of which is provided with a plurality of nozzles for ejecting ink in a direction intersecting an arrangement direction of nozzles in the nozzle array, the relative scanning to a same area of the printing medium being performed a plurality of times to perform the printing of the same area, said apparatus comprising: a dividing unit configured to divide print data for each nozzle array into print data for each of the plurality of times of scanning, according to a dot arrangement pattern of dots for printing which is determined correspondingly to the nozzle array; wherein the dot arrangement pattern corresponding to the nozzle array used in earlier printing in the scanning has higher frequency characteristic than that of the dot arrangement pattern corresponding to the nozzle array used in later printing in the scanning, among the plurality of nozzle arrays.

In a second aspect of the present invention, there is provided an ink jet printing method of performing relative scanning to a printing medium with a printing head that arranges a plurality of nozzle arrays each of which is provided with a plurality of nozzles for ejecting ink in a direction intersecting an arrangement direction of nozzles in the nozzle array, the relative scanning to a same area of the printing medium being performed a plurality of times to perform the printing of the same area, said method comprising: a dividing step of dividing print data for each nozzle array into print data for each of the plurality of times of scanning, according to a dot arrangement pattern of dots for printing which is determined correspondingly to the nozzle array; wherein the dot arrangement pattern corresponding to the nozzle array used in earlier printing in the scanning has higher frequency characteristic than that of the dot arrangement pattern corresponding to the nozzle array used in later printing in the scanning, among the plurality of nozzle arrays.

According to the above configuration, the frequency characteristic of the dot arrangement pattern that corresponds to a nozzle array used in an earlier printing by scanning is higher than that of the dot arrangement pattern that corresponds to a nozzle array used in a later printing by scanning. This cases the distribution of beading that may be generated in the image printed earlier to have a short period, and therefore the unevenness of the permeation speed caused by beading on the printing medium to be reduced. As a result, the distance that the united ink moves in the later printing is small and thus the ink can be restrained from being fixed in a position that is different from the original position. On the other hand, by making the dot arrangement have a low frequency characteristic in the later printing, high tolerability for an interference to the high frequency characteristic in the earlier printing and for an influence of external disturbances can be achieved, and thus the generation of moiré patterns, stripes, etc. can be suppressed.

Further features of the present invention will become apparent from the following description of exemplary embodiments with reference to the attached drawings.

DESCRIPTION OF THE EMBODIMENTS

The embodiments of the present invention will be explained in detail by referring to the drawings.

First, a dot arrangement having a high (or low) frequency characteristic is explained. The level of the frequency characteristic means the level of the average value of spatial frequencies when the power spectrum that is obtained from each spatial frequency by a Fourier transform of the arrangement of dots that constitute an image or a pattern is made to be a weighting factor to each spatial frequency.

Figure 1A:
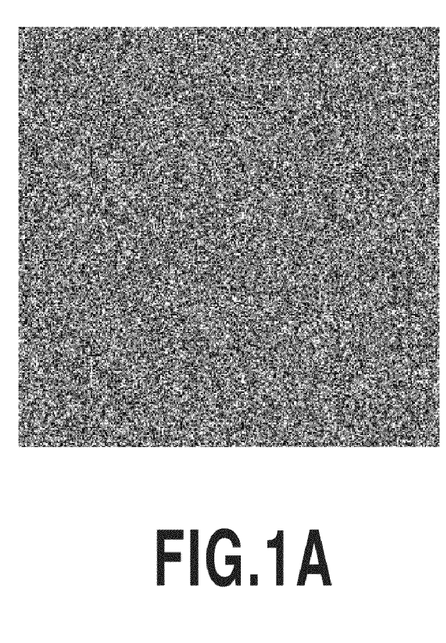
FIGS. 1A and 1B are views showing random images as one example of images having different frequency characteristics.
Figure 1B:
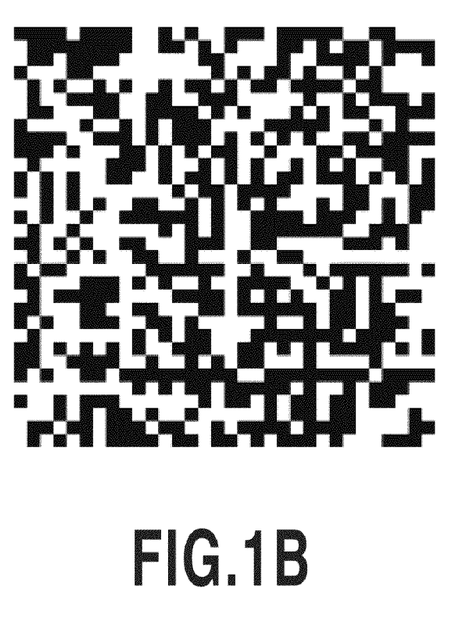
Figure 2A:
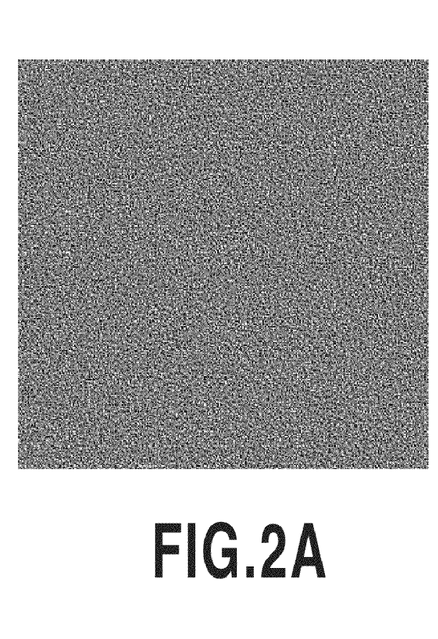
FIGS. 2A and 2B are views showing blue noise images as one example of images having different frequency characteristics.
Figure 2B:
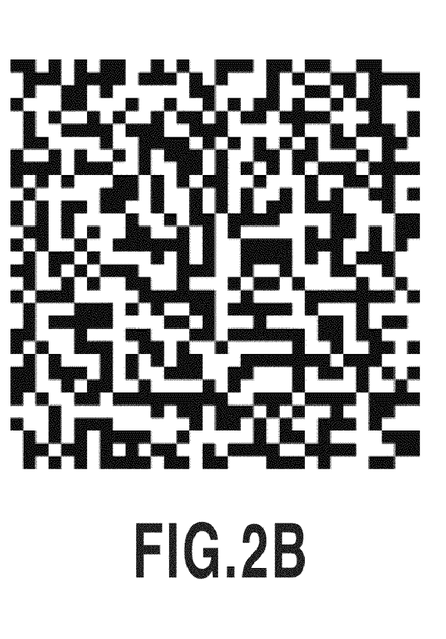
Figure 3A:
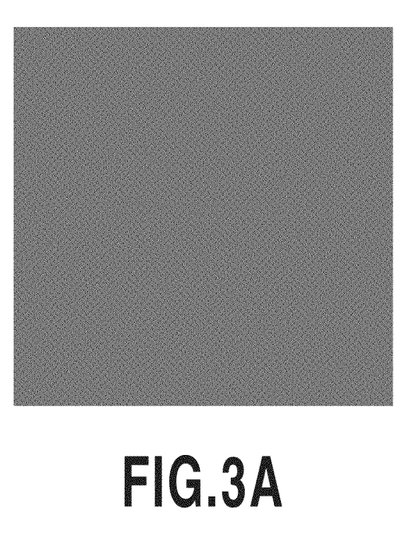
FIGS. 3A and 3B are views showing checker pattern images as one example of images having different frequency characteristics.
Figure 3B:
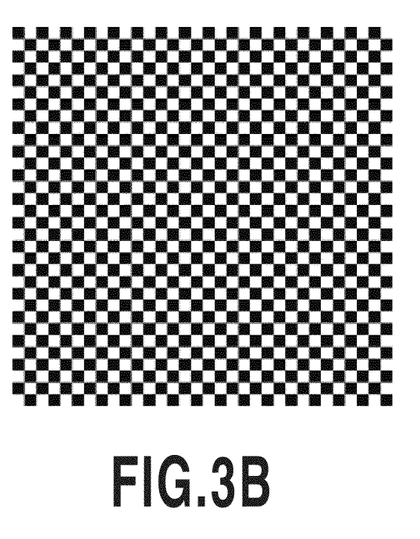

FIGS. 1A to 3B are views showing examples of images having different frequency characteristics. FIGS. 1A, 2A, and 3A show a random image, a blue noise image, and a checker pattern image respectively. FIGS. 1B, 2B, and 3B are views showing enlarged portions of the images of FIGS. 1A, 2A, and 3A, respectively.

Figure 4A:
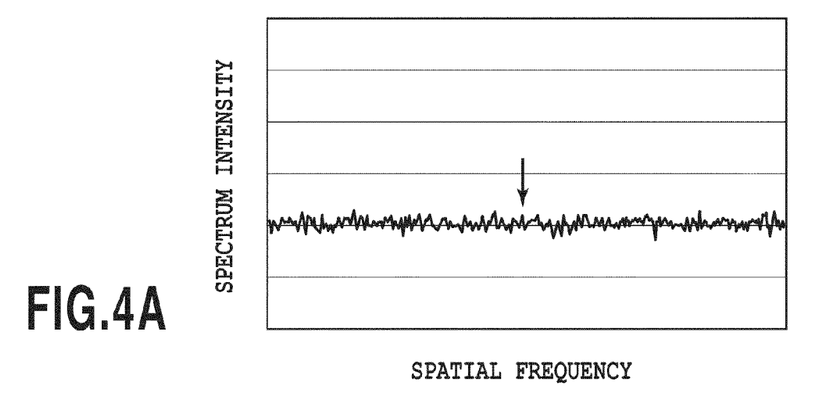
FIGS. 4A, 4B, and 4C are diagrams showing an average of the power spectra and the spatial frequencies of each of the images shown in FIGS. 1A to 3B.
Figure 4B:
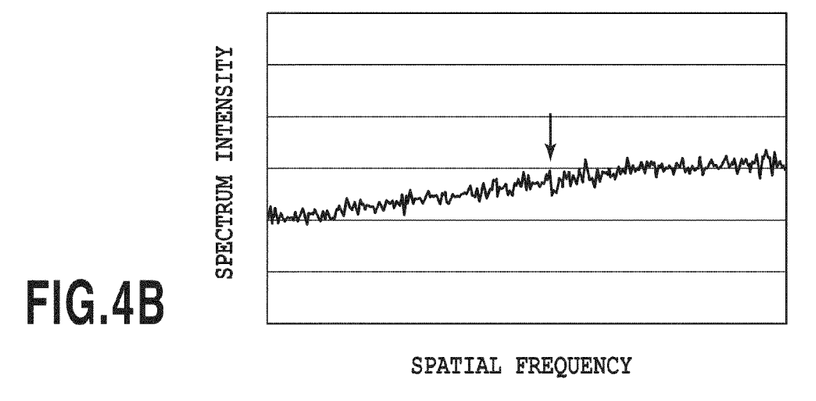
Figure 4C:
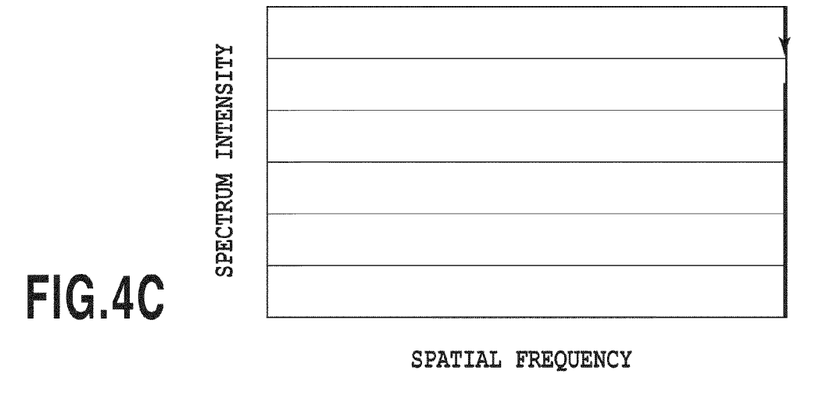

FIGS. 4A to 4C are diagrams showing the power spectra and the average (a value shown by an arrow in the drawing) of the spatial frequencies, of the random image shown in FIG. 1A, the blue noise image shown in FIG. 2A, and the checker pattern image shown in FIG. 3A respectively. As seen from these drawings, the checker pattern image has extremely high frequency characteristic and has almost no low frequency component (FIG. 4C). The random image has an almost constant spectrum intensity over the entire frequency range, and an average of the spatial frequency using the spectrum intensity as a weight, that is, the frequency characteristic, becomes relatively low (FIG. 4A). The blue noise image is an image having a larger spectrum intensity of the high spatial frequency than the spectrum intensity of low spatial frequency, and as a result, the frequency characteristic is higher than that of the random image and lower than that of the checker pattern image.

In each embodiment described later, the printing is performed using differences between levels of the frequency characteristic of the dot arrangements as described above. In this way, the density unevenness caused by beading that is generated in the multi-pass printing with a small number of passes is reduced, and the printing of an image having high robustness is performed.

Figure 5:
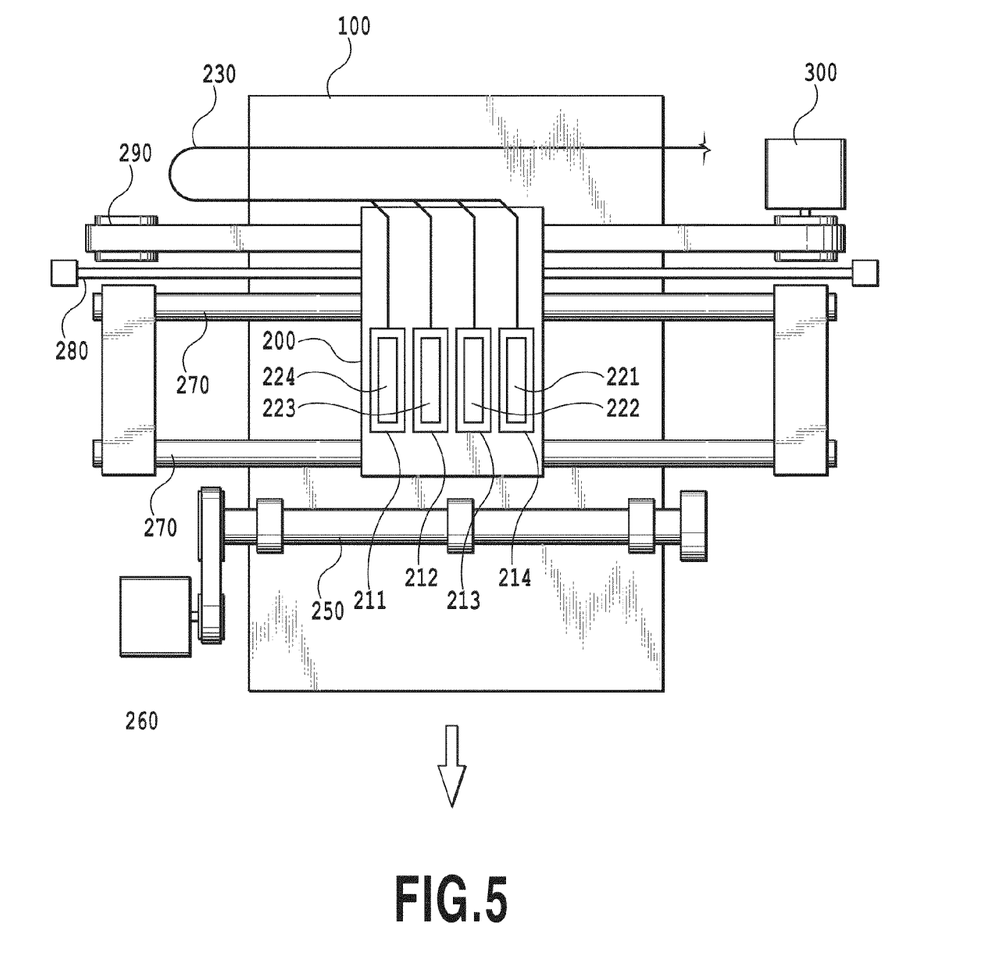
FIG. 5 is a view showing a schematic configuration of a serial inkjet printing apparatus according to one embodiment of the present invention.

FIG. 5 is a top view schematically showing the inkjet printing apparatus according to one embodiment of the present invention. FIG. 5 shows printing heads 211 to 214 on which a plurality of ejection orifices (also referred to as nozzles) for ejecting ink are arranged. The printing heads 211 to 214 eject inks of black (K), yellow (Y), magenta (M), and cyan (C) respectively. The printing heads in the present embodiment use a method of ejecting ink from the corresponding ejection orifice by generating an air bubble in the ink using heat energy that is generated by an electrothermal converter depending on the ejection data. Ink tanks 221 to 224 store inks of K, Y, M, and C, and supply ink to the corresponding printing head. These printing heads and ink tanks are detachably mounted in a carriage 200, and can be moved in the right and left direction in the drawing.

The movement of the carriage 200 is performed by driving by a carriage motor 300 while being guided and supported by a guide shaft 270 and a linear encoder 280 through a coupled driving belt 290. The timing of when a printing element is driven is read from the linear encoder 280, and a driving signal is forwarded to the electrothermal converter in the printing heads 211 to 214 according to this timing, as the carriage 200 moves. A control signal to the printing heads 211 to 214, including such driving signal is sent via a flexible cable 230. A printing medium 100 such as a printing paper is conveyed in an arrow direction (a sub-scanning direction) through a conveying roller that is not shown in the drawing while being held by a sheet-discharge roller 250, as a conveying motor 260 drives.

Figure 6:
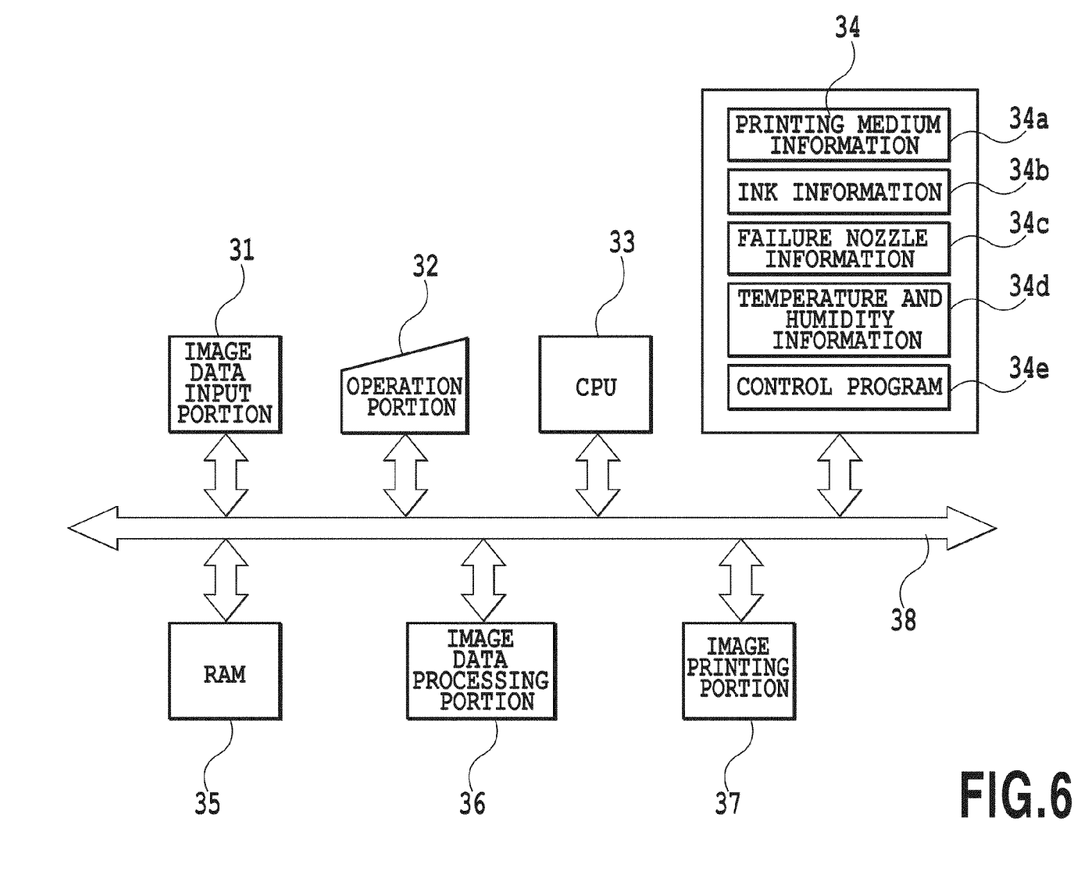
FIG. 6 is a block diagram showing a configuration of the control system of the printing apparatus shown in FIG. 5.

FIG. 6 is a block diagram showing a configuration of the control system of the printing apparatus shown in FIG. 5. In FIG. 6, an image data input portion 31 inputs image data that is input from a scanner, a digital camera, etc., and image data that is saved in a hard disk of a personal computer, etc. An operation portion 32 is equipped with various keys for an operator or a user to setup various parameters and to instruct beginning of the printing, etc. A CPU 33 as a central processing unit controls the entire printing apparatus by following a program stored in a storage medium 34. This control includes a control for dot data generation by an image data processing portion 36, which is explained by referring to FIG. 8 and following figures. A ROM, a FD, a CD-ROM, a HD, a memory card, and a magneto-optical disk, etc. can be used as the storage medium 34. The stored content includes information 34*a* regarding types of printing medium, information 34*b* regarding ink, information 34*c* regarding presence or absence of a failure nozzle and its position, information 34*d* regarding an environment such as temperature and humidity during printing, and various control programs 34*e*. A RAM 35 is used as a work area when various programs stored in the storage medium 34 are executed or as a temporary save area of the necessary data during error processing. Further, various data stored in the storage medium 34 can be temporarily copied in the RAM 35, and the CPU 33 can change this copied data content in the storage medium 34 and can perform the image processing while referring to the changed data.

The image data processing portion 36 performs a quantization process in which multi-valued image data received from the image data input portion 31 are converted into binary ejection data (dot data) that can be used for printing by the printing head, and outputs the data to an image printing portion 37.

Figure 7:
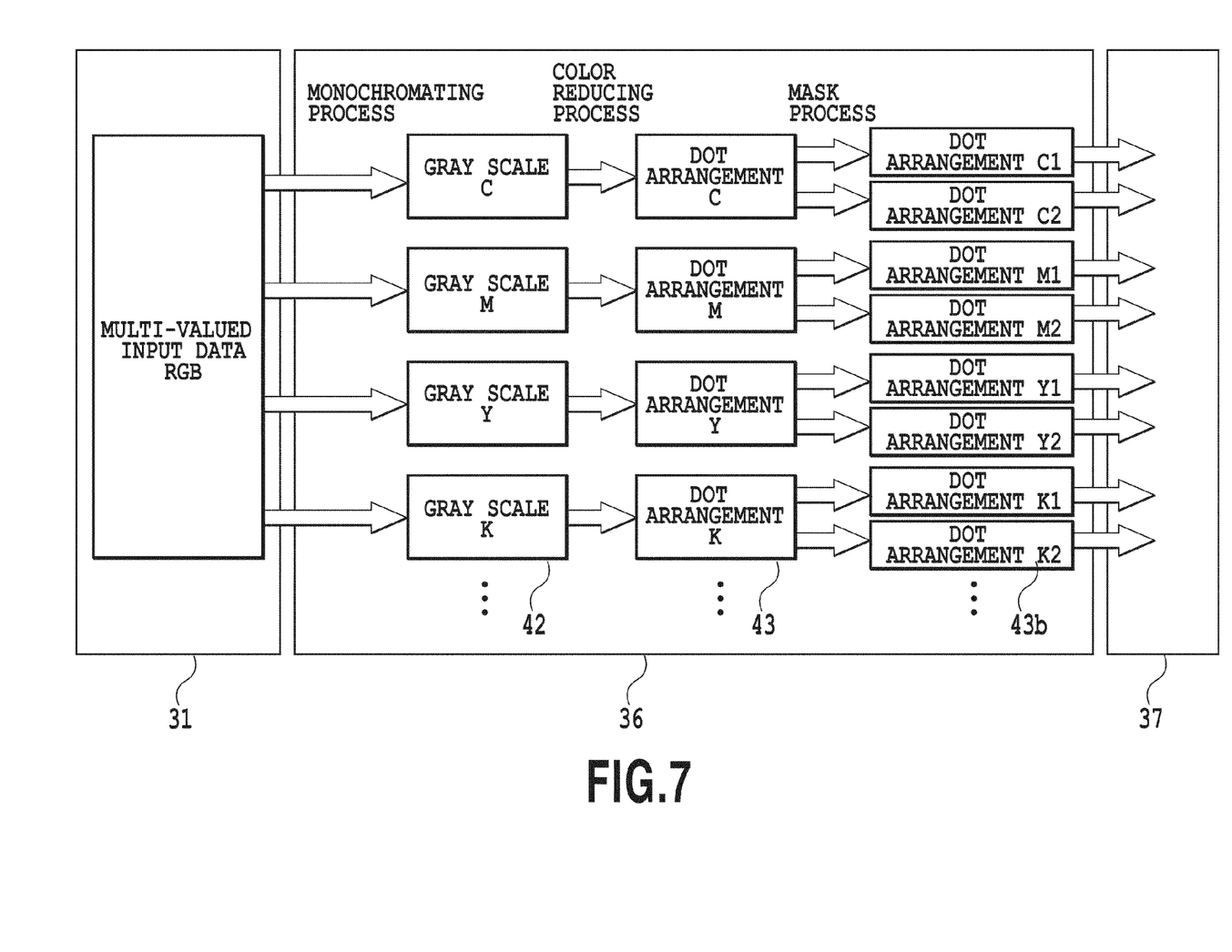
FIG. 7 is a block diagram showing a detail of the image data processing portion shown in FIG. 6.

FIG. 7 is a block diagram showing a detailed configuration of the image data processing portion 36. As shown in the figure, four gray scale data 42 of C, M, Y, K are generated by performing a monochromating process on multi-valued image data of 8 bits (256 gradations)×3 colors (RGB) that are input from the image data input portion 31. That is, the data corresponding to each ink of C, M, Y, and K that are used in the printing apparatus is generated. Next, dot data 43 that the corresponding printing head can print are generated based on the generated gray scale data of each color (color reducing process). That is, binary data that correspond to information of ejection and non-ejection by the printing head. Further, in order to perform the multi-pass printing of two passes, the dot data of each color are divided into data 43*b* of two scans (passes) using a mask that is explained in FIG. 8 and the following figures (mask process).

Referring to FIG. 6 again, the image printing portion 37 supplies to a driving circuit a signal for driving the printing head according to the ejection data that are generated by the image data processing portion 36, and causes the printing head of each color to eject ink from the ejection orifices. A bus 38 transmits an address signal, data, a control signal, etc. in the printing apparatus.

Embodiments regarding generation of the dot data in the above-described inkjet printing apparatus are explained below.

First Embodiment

A first embodiment is explained using an example of printing a solid image of green with multi-pass printing of two scans (two passes) in one direction using yellow and cyan nozzle arrays as one example. In a multi-pass printing, relatively scanning a printing medium with the printing head, in which a plurality of nozzle arrays of yellow, cyan, magenta, etc. are arranged, is performed in a direction that intersects with an arrangement direction of nozzles in the nozzle array, so that printing of an area is performed by the scanning the area a plurality of times.

Figure 8:
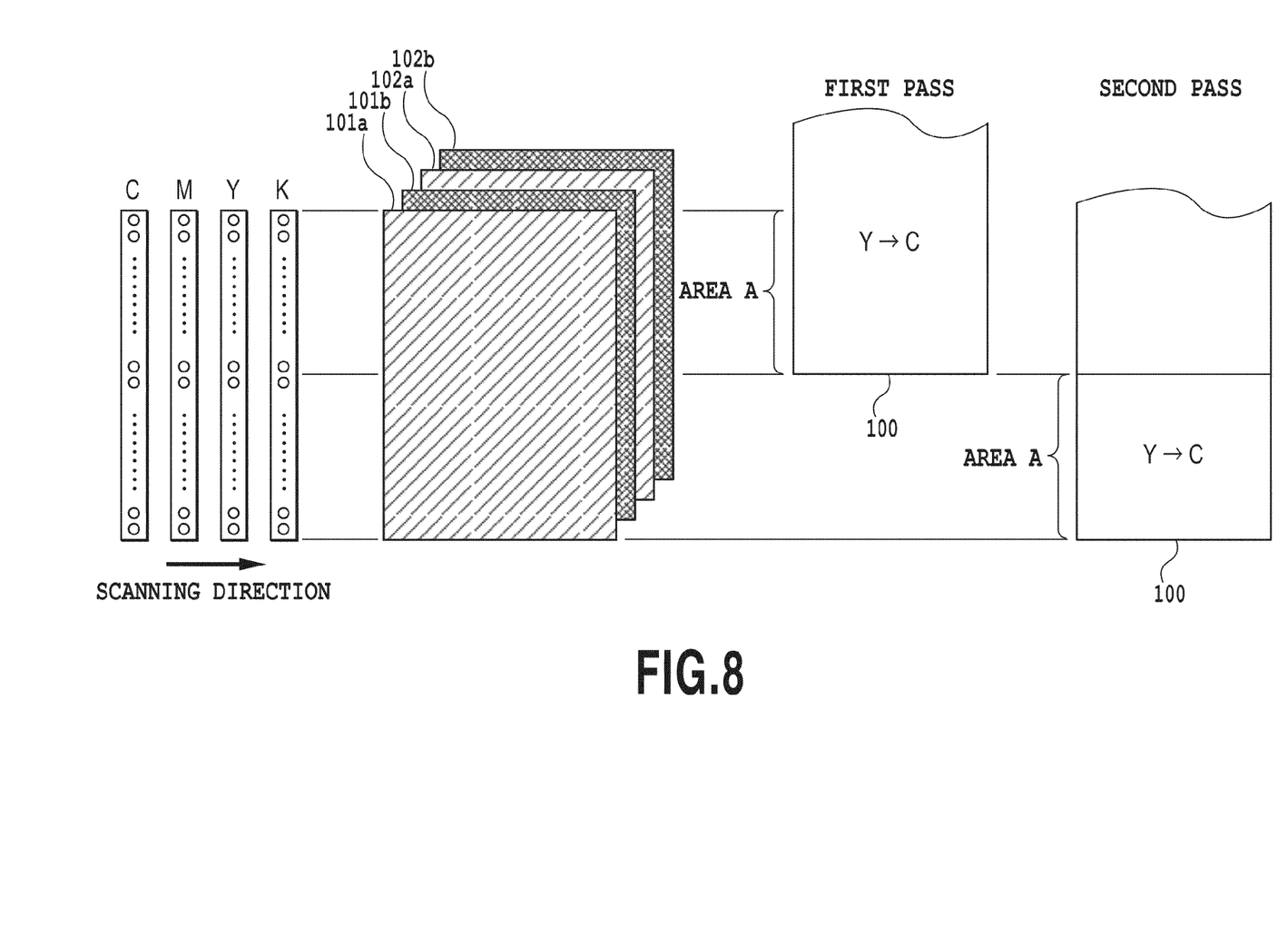
FIG. 8 is a diagram especially explaining the relationship of the masks for producing dot data, the printing heads that are used, and the passes in multi-pass printing of 2 passes according to a first embodiment of the present invention.

FIG. 8 is a diagram especially explaining a relationship of the masks for generating dot data with the printing heads that are used and the passes, in the multi-pass printing of two passes according to the first embodiment of the present invention. In the figure, reference signs 101*a*, 101*b*, 102*a* and 102*b* denote masks. In each mask, a mask pixel that permits and a mask pixel that does not permit printing by the dot data are arranged in a pattern according to mask characteristics that are described later, correspondingly to each nozzle in the nozzle array of each color.

In a first pass, for the nozzle array of Y ink, the dot data of Y for a first pass are generated using the mask 101*a*, and for the nozzle array of C ink, the dot data of C for the first pass, which is the same scan, are generated using the mask 101*b*. Then, the dots of Y ink and C ink are formed in this order on an area A having a width that is equivalent to ½ of the nozzle arrangement length of the nozzle array by scanning the area with each nozzle array. At this time, the area A is printed with the nozzles of the upper half of each nozzle array.

Next, the printing medium 100 is conveyed an amount that is equivalent to the width of the area A. After the conveyance, in a second pass, for the nozzle array of Y ink, the dot data of Y for the second pass are generated using the mask 102*a*, and for the nozzle array of C ink, the dot data of C for the second pass are generated using the mask 102*b*. Then, the dots of Y ink and C ink are formed in this order on the area A and an area continuing the area A, which has the same width as the area A, by scanning the areas with each nozzle array. At this time, the area A is printed with the nozzles of the lower half of each nozzle array. Further, the masks 101*a* and 102*a* and the masks 101*b* and 102*b* respectively have an arrangement of the print permitting pixels such that they are complementary to each other.

The printing data of every nozzle array of C and Y inks are divided into the printing data of a plurality of times of scanning according to the arrangement pattern of the dots that are determined by the mask corresponding to the nozzle array. Among the above-described nozzle arrays of the C and Y ink, the dot arrangement pattern corresponding to the nozzle array that is used in earlier printing in a scan is made to have a higher frequency characteristic than that of the dot arrangement pattern corresponding to the nozzle array that is used in a later printing in the scan.

Figure 9:
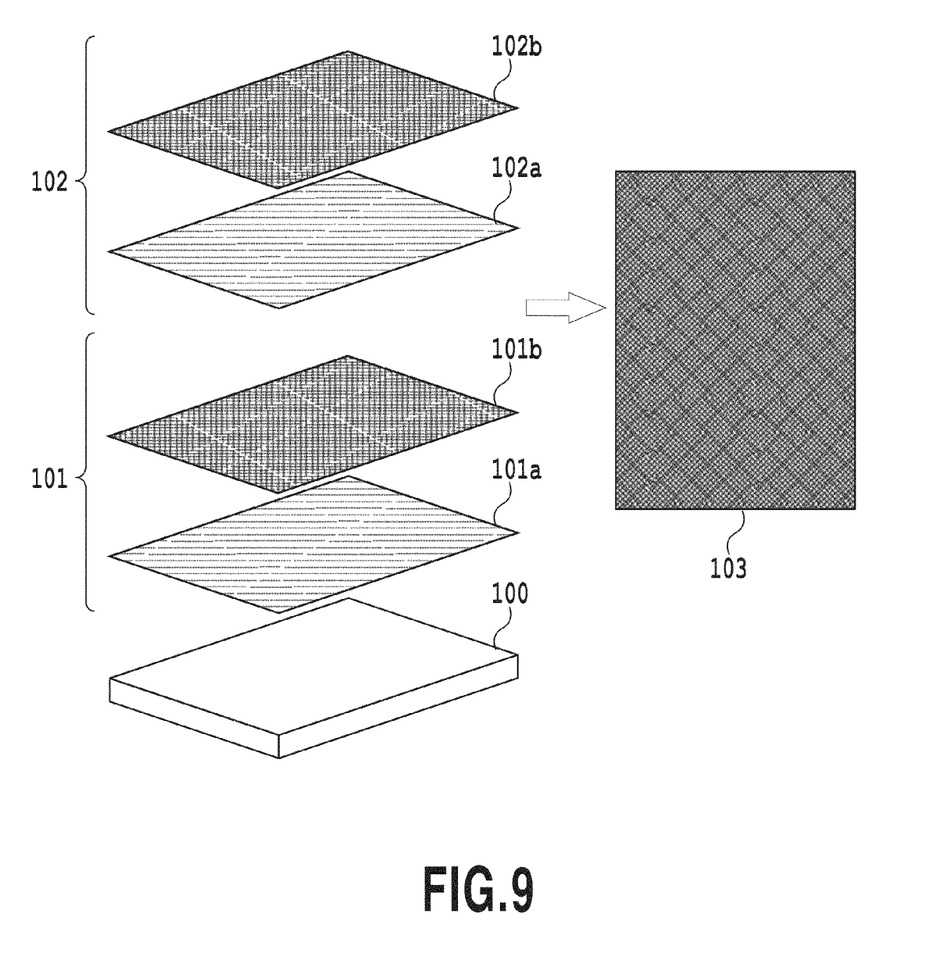
FIG. 9 is a view explaining a detail of the mask that is explained in FIG. 8.

FIG. 9 is a drawing explaining a detail of the mask of the present embodiment. The dot data are generated using the mask 101*a* of Y for the first pass, the mask 101*b* of C for the first pass, the mask 102*a* of Y for the second pass, and the mask 102*b* of C for the second pass. Then, the dot arrangement of an output image 103 can be obtained as a superposition of the dot data using these masks. Here, the mask 101*a* of Y for the first pass is a mask in which the dot arrangement of the checker pattern image shown in FIGS. 3A and 3B is made to be an arrangement of print permitting pixels, and the mask 101*b* of C for the first pass is a mask in which the dot arrangement of the random image shown in FIGS. 1A and 1B is made to be an arrangement of the print permitting pixels. Further, the mask 102*a* of Y for the second pass has an arrangement of the print permitting pixels that mutually complements the arrangement of the print permitting pixels of the mask 101*a* for the first pass, and the mask 102*b* of C for the second pass has an arrangement of the print permitting pixels that mutually complements the arrangement of the print permitting pixels of the mask 101*b* for the first pass.

According to the first embodiment using the above described masks, by employing the arrangement of the checker pattern having a high frequency characteristic for the mask of Y for the first pass, the distribution of the beading that may occur in the image printed in this preceding first pass is a distribution of a short period. This causes the unevenness of the permeation speed caused by beading on the printing medium to be reduced. As a result, the distance that the united ink moves in a later ink dot formation becomes small and thus the ink can be restrained from being fixed in a position that is different from the original position. On the other hand, by using a random arrangement having a low frequency characteristic as the mask of C for the first pass in which the dots are next formed, high tolerance for interference to the mask of Y for the first pass and for the influence of external disturbances can be achieved. As a result, the generation of moiré patterns, stripes, etc. due to interference, etc. can be suppressed. Moreover, because the ink is spread on almost all portions of the printing medium in this step, the influence of the C ink dot for the first pass to the unevenness of the permeation speed is smaller than that of the Y ink dot for the first pass. The influence of the C ink dot for the second pass that is formed last to the output image is the largest. However, by using the random image having a low frequency characteristic also as the mask, the generation of moiré patterns and stripes can be suppressed effectively. As a result, density unevenness, etc. caused by beading that is generated in multi-pass printing with a small number of passes is reduced, and the printing of an image having high robustness is performed.

In order to confirm the effect of the dot data generation according to the first embodiment, it was compared with printing by the conventional technique. The comparison is explained below.

In a first comparative example, a checker pattern image is used in both yellow for the first pass and cyan for the first pass as a mask, and a reverse (complement) image of the checker pattern image is used in yellow for the second pass and cyan for the second pass as a mask.

In a second comparative example, a random image is used in both yellow for the first pass and cyan for the first pass as a mask, and a reverse image of the random image is used in yellow for the second pass and cyan for the second pass as a mask.

In a third comparative example, a random image is used in yellow for the first pass and a checker pattern image is used in cyan for the first pass respectively as a mask, and a reverse image of the random image is used in yellow for the second pass and the reverse image of the checker pattern image is used in cyan for the second pass respectively as a mask.

A summary of the printing conditions of these comparative examples and the first embodiment and the result of visual evaluation is shown in Table 1. Evaluation items are granular feeling (isotropic color difference) and stripes (color difference in the nozzle arrangement direction).

TABLE 1

| | Printing Condition | | | | Result | |
|---|---|---|---|---|---|---|
| | First Pass | | Second Pass | | Granular | |
| | Yellow | Cyan | Yellow | Cyan | feeling | Stripes |
| Embodiment 1 | Checker | Random | Checker | Random | ○ | ○ |
| Comparative Example 1-1 | Checker | Checker | Checker | Checker | ⊙ | x |
| Comparative Example 1-2 | Random | Random | Random | Random | x | ○ |
| Comparative Example 1-3 | Random | Checker | Random | Checker | Δ | Δ |

As seen from the result shown in this table, the condition of the first embodiment can suppress two types of image quality degradation of unevenness and stripes at the same time. Further, it is confirmed in the comparison with the third comparative example that both the granular feeling and the stripes are improved due to not only the combination of the masks but also their order.

In the examples explained above, the printing of an image is performed using inks of two colors. However, it is obvious that application of the present invention is not limited to this example. The present invention can be applied also in an example in which the ink dots of three or more colors in one scan are used. That is, it is fine as long as the dot arrangement of the ink that is formed at first in the scan has a first frequency characteristic of a high frequency characteristic, and any of the dot arrangements of the ink that are formed in the same scan afterwards has a second frequency characteristic of a lower frequency characteristic than that of the first dot arrangement.

Second Embodiment

Figure 10:
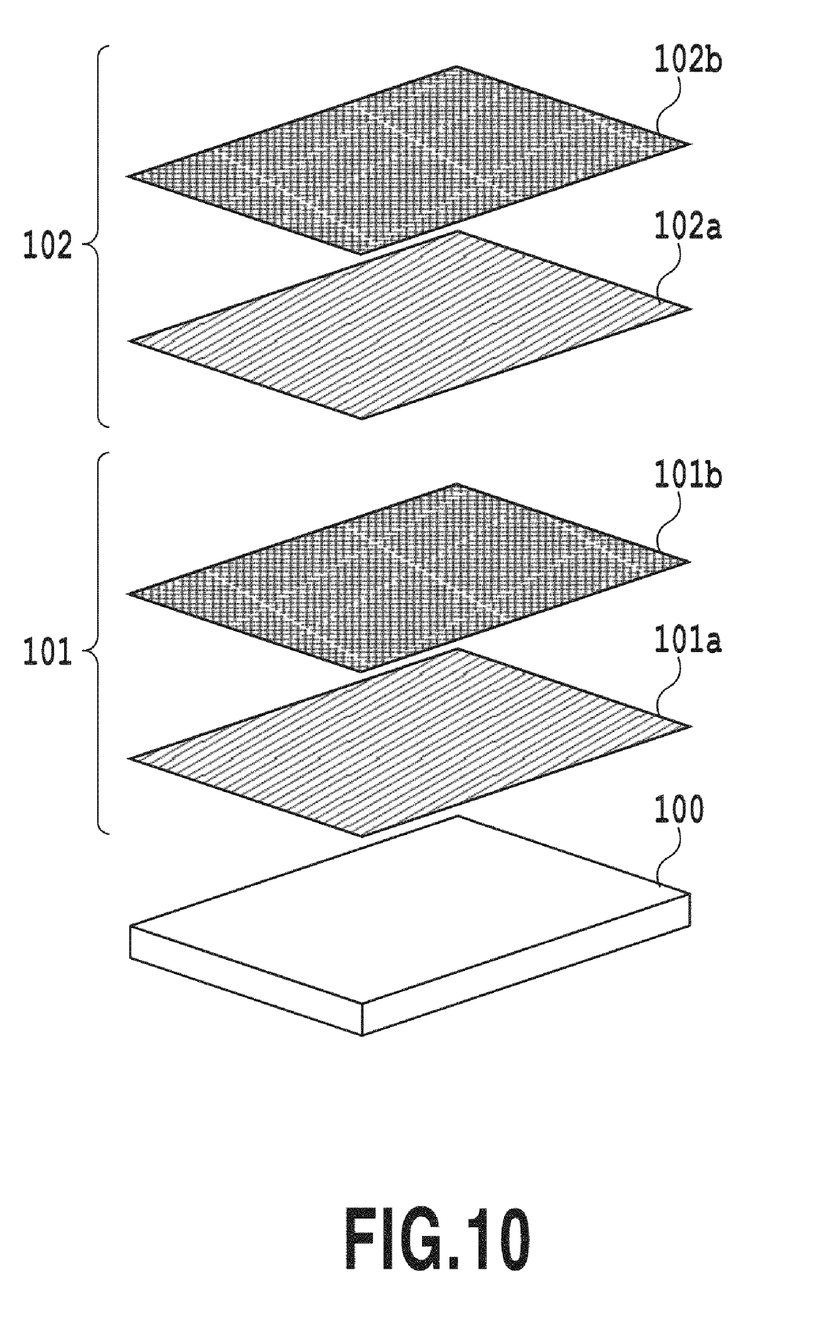
FIG. 10 is a view explaining a detail of the mask according to a second embodiment of the present invention.

In the second embodiment of the present invention, a dot arrangement of the blue noise image shown in FIGS. 2A and 2B and a dot arrangement of the random image shown in FIGS. 1A and 1B are used as the mask 101a of Y for the first pass and the mask 101b of C for the first pass respectively as shown in FIG. 10. A mask having the arrangement of the complementary pattern of the blue noise mask for the first pass and a mask having the arrangement of the complementary pattern of the random mask for the first pass are used as the mask of Y for the second pass and the mask 102b of C for the second pass respectively.

According to the second embodiment, the same effect as the first embodiment can be obtained by using the blue noise mask having a relatively high frequency characteristic as a mask of yellow for the first pass and by using the random mask having a low frequency characteristic as the mask of C for the first pass that is performed next.

In the same manner as the first embodiment, comparative experiments with printing by the conventional technique are performed in order to confirm the effect of the second embodiment. The comparison is explained below.

In a first comparative example, the blue noise mask is used in both yellow for the first pass and cyan for the first pass, and a complementary pattern mask of the blue noise is used in yellow for the second pass and cyan for the second pass. In a second comparative example, the random mask is used in both yellow for the first pass and cyan for the first pass, and the complementary pattern mask of the random mask is used in yellow for the second pass and cyan for the second pass as a mask. In a third comparative example, the random mask and the blue noise mask are used in yellow for the first pass and cyan for the first pass respectively, and a complementary pattern of the random mask and a complementary pattern of the blue noise mask are used in yellow for the second pass and cyan for the second pass respectively.

A summary of the comparative examples and the second embodiment and the result of visual evaluation are shown in Table 2. Evaluation items are granular feeling (isotropic color difference) and moiré patterns and stripes (color difference in a nozzle arrangement direction).

TABLE 2

|  | Printing Condition | | | | Result | |
| --- | --- | --- | --- | --- | --- | --- |
|  | First Pass | | Second Pass | | Granular | |
|  | Yellow | Cyan | Yellow | Cyan | feeling | Stripes |
| Embodiment 2 | Blue Noise | Random | Blue Noise | Random | ○ | ○ |
| Comparative Example 2-1 | Blue Noise | Blue Noise | Blue Noise | Blue Noise | ⊙ | x |
| Comparative Example 2-2 | Random | Random | Random | Random | x | ○ |
| Comparative Example 2-3 | Random | Blue Noise | Random | Blue Noise | Δ | Δ |

As seen from the result shown in this table, the condition of the second embodiment can suppress two types of image quality degradation of unevenness and stripes at the same time. Further, it is confirmed in the comparison with the third comparative example that both the graininess and the stripes are improved due to not only the combination of the masks but also their order.

Another Embodiment

Each of the embodiments described above relates to the multi-pass printing by a serial method. However, the application of the present invention is not limited to these embodiments. The present invention can also be applied to a so-called full line type printing apparatus in which the nozzle arrays of the printing head are provided over the width of the printing medium that is conveyed. For example, the printing that is the same as the multi-pass printing of two passes can be performed by providing two sets of nozzle arrays of C, M, Y, and K along a conveying direction of printing medium. In this case, a first set of the nozzle arrays that performs the dot formation first can correspond to the first pass, and a second set that is on the downstream side in the conveying direction can correspond to the second pass.

A Further Embodiment

Further, the control program to perform the image process that is described above is not necessarily integrated into the printing apparatus in advance, and it may be properly supplied from a printer driver in the host apparatus side.

Aspects of the present invention can also be realized by a computer of a system or apparatus (or devices such as a CPU or MPU) that reads out and executes a program printed on a memory device to perform the functions of the above-described embodiment(s), and by a method, the steps of which are performed by a computer of a system or apparatus by, for example, reading out and executing a program printed on a memory device to perform the functions of the above-described embodiment(s). For this purpose, the program is provided to the computer for example via a network or from a printing medium of various types serving as the memory device (e.g., computer-readable medium).

In addition, the form of the image process system does not matter if it is for personal use, business use, or industrial use. It is not limited to an image process system having an image data supply apparatus such as a computer, a scanner, and a digital camera and a printer as an image output terminal. For example, the form may be a copier of which a scanner and a printer apparatus are united, a facsimile apparatus of which a data sending and receiving apparatus and a printer apparatus are united, a word processor and an electronic typewriter with which a printer is united, a printer-unified digital camera, etc.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-186577, filed Aug. 11, 2009, which is hereby incorporated by reference herein in its entirety.

What is claimed is:

1. An ink jet printing apparatus comprising:
a printing head including a first and second nozzle arrays, each of which is provided with a plurality of nozzles for ejecting ink for printing on a printing medium;
a scanning unit for performing relative scanning of the print head and the printing medium in a direction intersecting an arrangement direction of nozzles in the nozzle arrays over a same area of the printing medium a plurality of times; and
a dividing unit configured to divide print data for each nozzle array into print data for each of the plurality of times of scanning, according to a dot arrangement pattern of dots for determining an arrangement of dots in the area for dividing the print data,
wherein the dot arrangement pattern corresponding to the first nozzle array ejects ink earlier than the second nozzle array to the area has a higher frequency characteristic than that of the dot arrangement pattern corresponding to the second nozzle array array.

2. The ink jet printing apparatus as claimed in claim 1, wherein said dividing unit uses a mask as the dot arrangement pattern determined corresponding to the nozzle array.

3. The ink jet printing apparatus as claimed in claim 1, wherein the dot arrangement pattern corresponding to the first nozzle array ejecting ink earlier than the second nozzle array to the area in the same scanning has a higher frequency characteristic than that of the dot arrangement pattern corresponding to the second nozzle array.

4. The ink jet printing apparatus as claimed in claim 1, wherein the dot arrangement pattern corresponding to the first nozzle array ejecting ink in a first scanning of the plurality of times of the scanning to the area has a higher frequency characteristic than that of the dot arrangement pattern corresponding to the second nozzle array in the first scanning of the plurality times of the scanning to the area.

5. A data generating apparatus that generates print data used in an ink jet printing apparatus that performs relative scanning of a printing medium and a printing head including first and second nozzle arrays, each of which is provided with a plurality of nozzles for ejecting ink for printing on the printing medium, in a direction intersecting an arrangement direction of nozzles in the nozzle arrays over a same area of the printing medium a plurality of times, said data generating apparatus comprising:
a dividing unit configured to divide print data for each nozzle array into print data for each of the plurality of times of scanning, according to a dot arrangement pattern of dots for determining an arrangement of dots in the area for dividing the print data, wherein the dot arrangement pattern corresponding to the first nozzle array ejecting ink earlier than the second nozzle array to the area has a higher frequency characteristic than that of the dot arrangement pattern corresponding to the second nozzle array.

6. A program for causing a computer to function as the data generating apparatus as claimed in claim 5.

7. An ink jet printing method of performing relative scanning of a printing medium and a printing head including a first and second nozzle arrays, each of which is provided with a plurality of nozzles for ejecting ink for printing on the printing medium, in a direction intersecting an arrangement direction of nozzles in the nozzle arrays over a same area of the printing medium a plurality of times, said method comprising:

a dividing step of dividing print data for each nozzle array into print data for each of the plurality of times of scanning, according to a dot arrangement pattern of dots for determining an arrangement of dots in the area for dividing the print data, wherein the dot arrangement pattern corresponding to the first nozzle array ejecting ink earlier than the second nozzle array to the area has a higher frequency characteristic than that of the dot arrangement pattern corresponding to the second nozzle array.

* * * * *